United States Patent
Kaufmann et al.

(10) Patent No.: US 9,026,843 B2
(45) Date of Patent: May 5, 2015

(54) ARBITRATION SUSPENSION IN A SAS DOMAIN

(71) Applicant: LSI Corporation, San Jose, CA (US)

(72) Inventors: Reid A. Kaufmann, Wichita, KS (US);
Charles D. Henry, Wichita, KS (US);
Jeffrey D. Weide, Wichita, KS (US)

(73) Assignee: LSI Corporation, Milpitas, CA (US)

( * ) Notice: Subject to any disclaimer, the term of this patent is extended or adjusted under 35 U.S.C. 154(b) by 168 days.

(21) Appl. No.: 13/962,694

(22) Filed: Aug. 8, 2013

(65) Prior Publication Data

US 2015/0039932 A1 Feb. 5, 2015

Related U.S. Application Data

(60) Provisional application No. 61/862,136, filed on Aug. 5, 2013.

(51) Int. Cl.
*G06F 11/00* (2006.01)
*G06F 11/20* (2006.01)

(52) U.S. Cl.
CPC .................... *G06F 11/201* (2013.01)

(58) Field of Classification Search
CPC .................................................. G06F 11/201
See application file for complete search history.

(56) References Cited

U.S. PATENT DOCUMENTS

| | | |
|---|---|---|
| 7,584,319 B1 | 9/2009 | Liao et al. |
| 8,560,746 B2 | 10/2013 | Honjo et al. |
| 2004/0190554 A1 | 9/2004 | Galloway |
| 2008/0155562 A1 * | 6/2008 | Stenfort et al. ............... 719/318 |
| 2011/0320706 A1 * | 12/2011 | Nakajima .................... 711/114 |
| 2013/0238930 A1 * | 9/2013 | Umbehocker ............... 714/6.32 |

OTHER PUBLICATIONS

Working Draft American National Standard. Project T10/BSR INCITS 492.

* cited by examiner

*Primary Examiner* — Michael Maskulinski
(74) *Attorney, Agent, or Firm* — Duft Bornsen & Fettig LLP; Gregory T. Fettig

(57) ABSTRACT

Systems and methods presented herein provide for managing connections in a SAS domain comprising at least first and second expanders. The first expander detects a failure of the initiator and indicates a change in the SAS domain to the second expander. The second expander detects an increase in arbitration wait time for a connection between the initiator and the target device, determines a race condition exists in the second expander, denies the connection between the initiator and the target device, directs the target device to wait for another connection, performs a discovery of the domain based on the discovery request from the first expander, and prevents a subsequent connection by the target device to the initiator after discovery completes.

18 Claims, 5 Drawing Sheets

ARBITRATION SUSPENSION IN A SAS DOMAIN

CROSS REFERENCE TO RELATED APPLICATIONS

This patent application claims priority to, and thus the benefit of an earlier filing date from, U.S. Provisional Patent Application Nos. 61/862,136 (filed Aug. 5, 2013), the entire contents of which are hereby incorporated by reference.

FIELD OF THE INVENTION

The invention generally relates to managing connections in Serial Attached Small Computer System Interface (SAS) domain.

BACKGROUND

SAS domains generally employ multiple target devices (e.g., storage devices) which may be accessed by initiators of host systems through one or more expanders in order to read and write data. Some SAS domains are "deeply cascaded" in that several tiers of expanders separate the host initiators from the target devices and form a "switched fabric" that can be switch data between target devices and initiators of the domain. The expanders perform a discovery process that allows the expanders to "map" all of the devices in the domain such that connections between target devices and initiators can be established. Typically, the connections between target devices and initiators are arbitrated because target devices may need to connect to the same initiators at the same time. Occasionally, however, initiators fail during normal operations in the SAS domain and arbitration wait times can increase dramatically and cripple the operations of the SAS domain because the target devices end up continually attempting to connect to an initiator that is no longer present when discovery is being attempted.

SUMMARY

Systems and methods presented herein provide for managing connections between initiators and target devices through SAS expanders. More specifically, the SAS domain comprises at least first and second SAS expanders that are operable to suspend arbitration of connections between initiators and target devices when an initiator fails. To illustrate, a first SAS expander is coupled to an initiator. A second SAS expander is coupled to the first expander and to a target device, and is operable to connect the target device to the initiator through the first expander. The first expander is operable to detect a failure of the initiator (e.g., it has been detached, fails to respond, etc.), and to indicate a change in the SAS domain to the second expander. The second expander is operable to detect an increase in arbitration wait time for a connection between the initiator and the target device, to determine that a race condition exists in the second expander based on the increased arbitration wait time, to deny the connection between the initiator and the target device based on the increased arbitration wait time, and to direct the target device to wait for another connection. The second expander then performs a discovery of the domain based on the discovery request from the first expander and thereby prevents a subsequent connection by the target device to the initiator after discovery completes (i.e., because the initiator is no longer in the domain and the routing tables of the second expander express such).

The various embodiments disclosed herein may be implemented in a variety of ways as a matter of design choice. For example, the embodiments may take the form of computer hardware, software, firmware, or combinations thereof. Other exemplary embodiments are described below.

BRIEF DESCRIPTION OF THE FIGURES

Some embodiments of the present invention are now described, by way of example only, and with reference to the accompanying drawings. The same reference number represents the same element or the same type of element on all drawings.

DETAILED DESCRIPTION OF THE FIGURES

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention and are to be construed as being without limitation to such specifically recited examples and conditions. As a result, the invention is not limited to the specific embodiments or examples described below.

Figure 1:
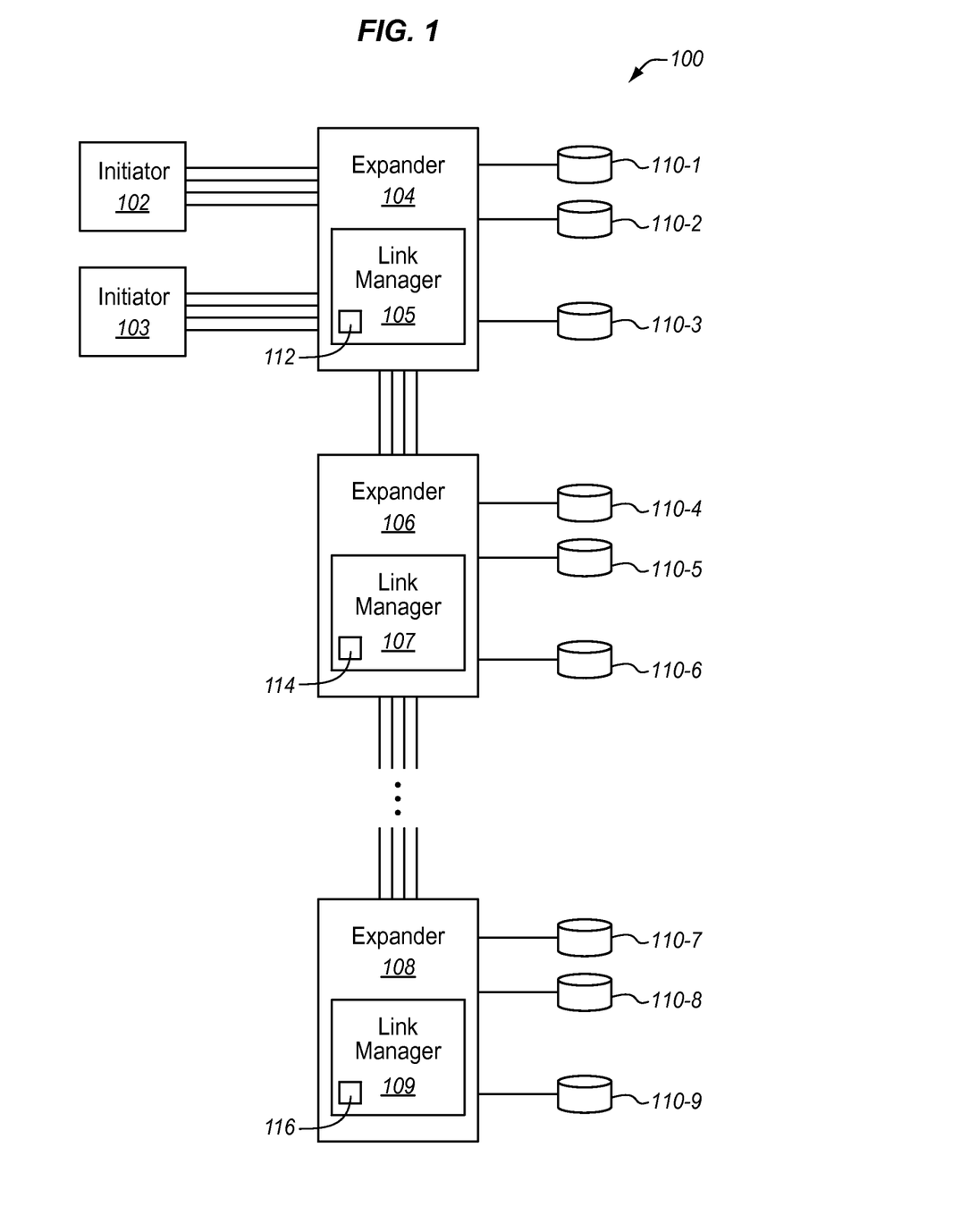
FIG. 1 is a block diagram of an exemplary SAS domain that establishes connections between initiators and target devices.

FIG. 1 is a block diagram of an exemplary SAS domain 100 comprising a plurality of initiators 102/103, a plurality of expanders 104/106/108, and a plurality of target devices 110-1-110-9. The expanders 104/106/108, via their respective link managers 105/107/109, are operable to arbitrate connections between the initiators 102/103 and the target devices 110. Arbitration is a process that allows connection attempts between the initiators 102/103 and the target devices 110 to be prioritized. For example, since many different target devices 110 can attempt to connect to an initiator at the same time, connections between the target devices 110 and the initiators 102/103 are arbitrated.

Before connections can be established, the initiators 102/103 and the target devices 110 are first discovered such that routing tables can be established in the expanders 104/106/108. Discovery in SAS is a process (hardware and/or software) that establishes whether neighboring devices are present, what type of devices they are, what link rates they support, and their SAS addresses such that each component (i.e., initiators 102/103, expanders 104/106/108, and devices 110) can be aware of their neighboring components and communicate with them. Once discovery is complete and the routing tables of the expanders 104/106/108 have been configured, the link managers 105/107/109 can arbitrate connections between the initiators 102/103 and the target devices 110.

A connection is first established when a target device 110 and an initiator 102/103 exchange IDs and other information pertaining to the connection via the SAS protocol (e.g., via Open Address Frames and Open Accepts). The target devices 110 and the initiators 102/103 may retain this information for future reference to quickly reestablish connections. The target devices 110 then compete via arbitration to connect to a particular initiator (102/103), and vice versa, based on a variety of factors (e.g., SAS address number, transaction duration, etc.).

The expanders 104/106/108 are SAS expanders operable to connect the initiators 102/103 to the target devices 110 via the SAS protocol. Each expander 104/106/108 is any device, system, software, or combination thereof operable to connect the target devices 110 and the initiators 102/103 (and other expanders) to form a data network, or "switched fabric", via the SAS protocol. One example of the expanders 104/106/108 is a wide port SAS expander. Such systems can be found in Redundant Array of Independent Disks (RAID) storage systems and other data storage networks employing disk drives.

Each expander 104/106/108 includes a link manager 105/107/109 that is operable to establish connections between the initiators 102/103 and the target devices 110 through a plurality of physical transceivers, or "PHYs", and to perform arbitration on behalf of their respective expanders 104/106/108. Each link manager 105/107/109 includes a Serial Management Protocol (SMP) initiator 112/114/116 that is operable to configure and maintain the routing tables between the target devices 110 and the initiators 102/103 via the discovery process.

The target devices 110 are any devices capable of connecting with the initiators 102/103 through the expanders 104/106/108 to respond to read and write requests generated by the initiators 102/103. Examples of the target devices 110 include computer disk drives, solid state drives, and other storage devices. PHYs comprise any combination of hardware, software, firmware, and other associated logic capable of operating as physical transceivers between the elements disclosed herein. The initiators 102/103 may be configured in separate host systems or in a single host system as part of a redundancy implementation with the host system. Each initiator 102/103 may include a storage controller, or Host Bus Adapter (HBA), that processes host Input/Output (I/O) operations that are routed or otherwise switched (e.g., via the switched fabric) to communicate with the target devices 110.

Figure 2:
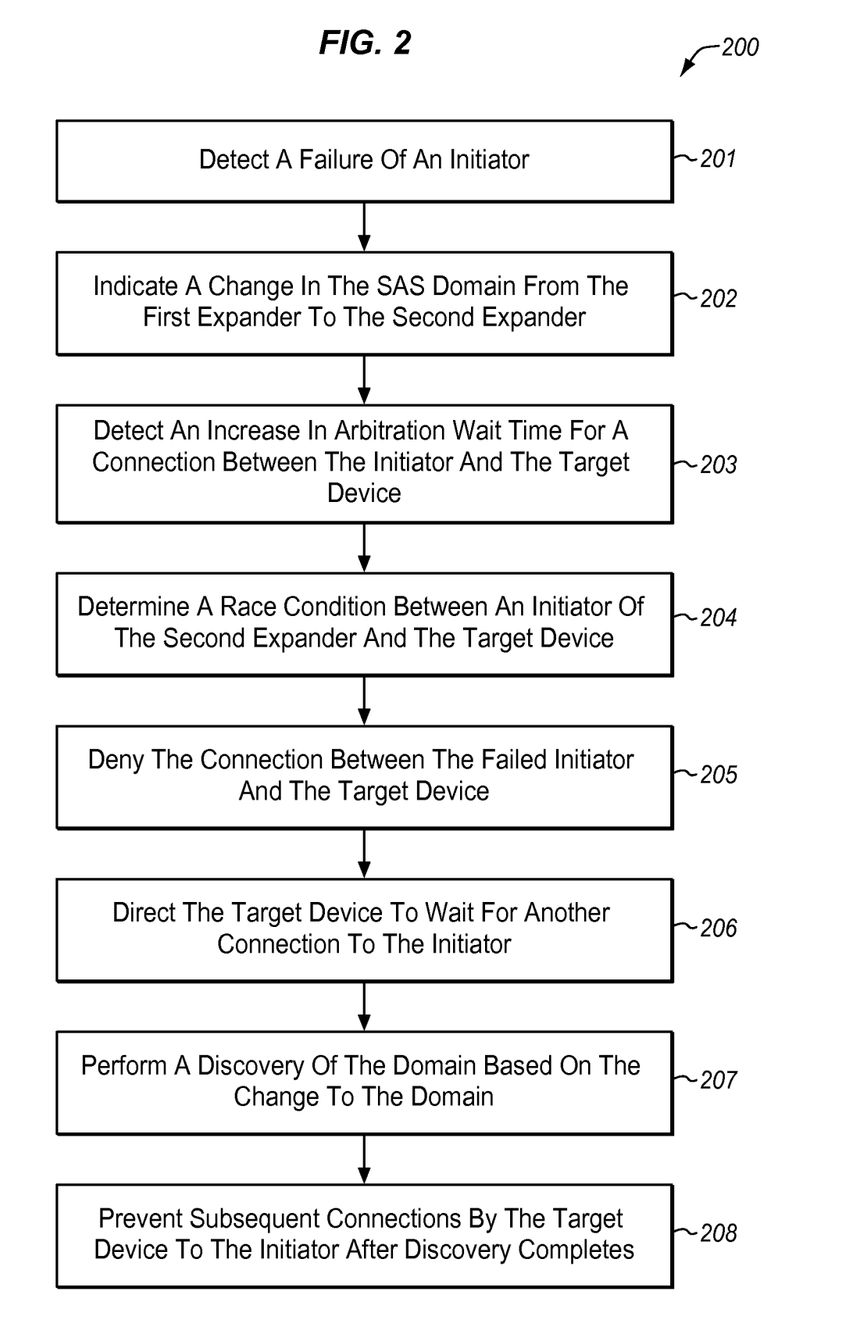
FIG. 2 is a flowchart of an exemplary process for managing the connections between the initiators and the target devices operable within the SAS domain of FIG. 1.

Discussion of the expanders 104/106/108, their respective link managers 105/107/109, and the arbitration process thereof will now be directed to the flowchart of FIG. 2. It should be noted that, while the SAS domain 100 is illustrated with a certain number of initiators, expanders/link managers, and target devices, the invention is not intended to be limited to such. Rather, FIG. 1 is merely intended to concisely illustrate certain principles of the SAS domain 100 and the arbitration suspension employed by the expanders 104/106/108.

FIG. 2 is a flowchart of an exemplary process 200 for managing the connections between the initiators 102/103 and the target devices 110 operable within the SAS domain 100 of FIG. 1. Assume for the sake of this embodiment that the SAS domain 100 is operational and that the initiators 102/103 have established connections with one or more of the target devices 110. As such, typical I/O operations are being performed through the SAS domain 100. During this time, connections between the target devices 110 and the initiators 102/103 are being arbitrated by the expanders 104/106/108. At some point in time thereafter, an initiator fails (e.g., the initiator 102) and discovery in the SAS domain 100 commences to remove the failed initiator 102 from routing tables of the expanders (e.g., the expanders 106/108).

When the initiator fails, the expander 104 detects the failure of the initiator 102, in the process element 201, because it is directly attached to the expander 104. As the initiator 102 is directly attached to the expander 104, routing tables of the expander 104 do not generally include information pertaining to the initiator 102. However, since the SAS domain 100 has changed, the expander 104 indicates (e.g., broadcasts) that a change has occurred in the SAS domain 100, in the process element 202. In this regard, the expander 104 may issue a discovery request to a second expander 106 (as well as any other expanders in the SAS domain 100) such that the routing tables of the expander 104 may be updated. The expander 106 may operate in similar fashion to update its own routing tables as part of the SAS discovery process.

As connections between the target devices 110 and the initiator 102 have been established and are presently being arbitrated by the expanders 104/106/108, arbitration wait times can dramatically increase because the target devices 110 may still try to connect to the failed initiator 102. For example, the target device 110-4 after establishing a connection to the initiator 102 may need to connect to the initiator 102 to fulfill a read request from the initiator 102. Other target devices 110 may have similar needs to connect to the initiator 102. Accordingly, these target devices 110 continue to attempt connections to the failed initiator 102 through arbitration by the expanders 104/106/108. And, as target devices 110 keep attempting to connect with the failed initiator 102, arbitration wait times dramatically increase and clog discovery attempts by the expanders 104/106/108 to update their routing tables.

The second expander 106 detects the increase in the arbitration wait time, in the process element 203. And, based on this increased arbitration wait time, the second expander 106 determines that a race condition exists between the SMP initiator 114 of the expander 106 and the target device 110-4, in the process element 204. For example, while the target devices 110 compete for connection to the failed initiator 102, the SMP initiator 114 of the expander 106 is attempting to also compete for a lane to perform discovery of the SAS domain 100. As the lane between the expander 104 and the expander 106 clogs due to the competition, the discovery process by the expander 106 is either slowed or stalled.

To open the lane for the discovery process, the expander 106 then denies connections between the failed initiator 102 and the target devices 110, in the process element 205. For example, the expander 106 may receive a connection attempt from the target device 110-4 for a connection to the failed initiator 102. The expander 106 may issue a Break of the SAS protocol to the target device 110-4 to remain compliant with the SAS protocol.

Afterwards the expander 106 may direct the target device 110-4 to wait for another connection to the initiator 102 (e.g., via an Arbitration In Progress of the SAS protocol), in the process element 206. Since the target device 110-4 (and any others) is waiting for the expander 106 to let it know when it can connect to the initiator 102, the expander 106 can perform a discovery of the SAS domain 100 based on the discovery request from the expander 104, in the process element 207. Once the expander 106 completes discovery of the SAS domain 100 and its routing tables are updated to remove information pertaining to the failed initiator 102, the expander 106 prevents subsequent connections by the target device 110-4 to the failed initiator 102, in the process element 208. For example, because the expander 106 has updated its routing tables, the failed initiator 102 is no longer in the routing tables as part of the SAS domain 100. This deletion of the failed initiator 102 from the routing table of the expander 106 prevents the target device 110-1 from connecting to the failed initiator 102. Such may be performed by the expander 106 issuing an Open Reject-No Destination of the SAS protocol to the target device 110-4.

Although shown and described with respect to the expander 106 detecting an increase in the arbitration wait time and subsequent determinations of race conditions, the invention is not intended to be so limited. Rather, the example is merely intended to show how a first expander detects a failure of a directly attached initiator and how a second expander in the SAS domain 100 can overcome race conditions such that discovery operations can be performed. Once discovery of the SAS domain 100 is complete and routing tables of the expanders are updated, new connections can be established and arbitrated as usual, albeit without the failed initiator 102.

Figure 3:
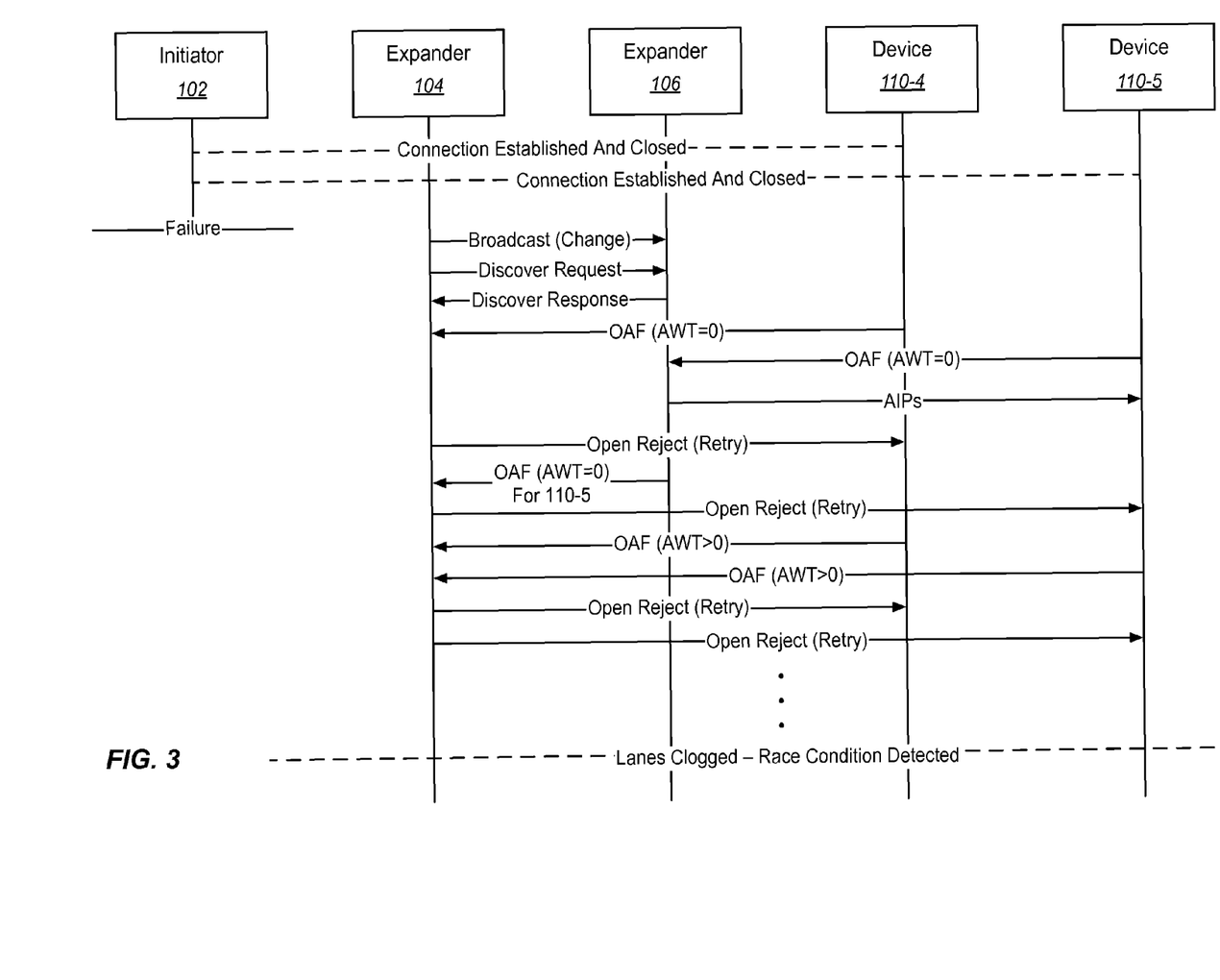
FIGS. 3 and 4 are exemplary transaction diagrams of the SAS domain of FIG. 1.
Figure 4:
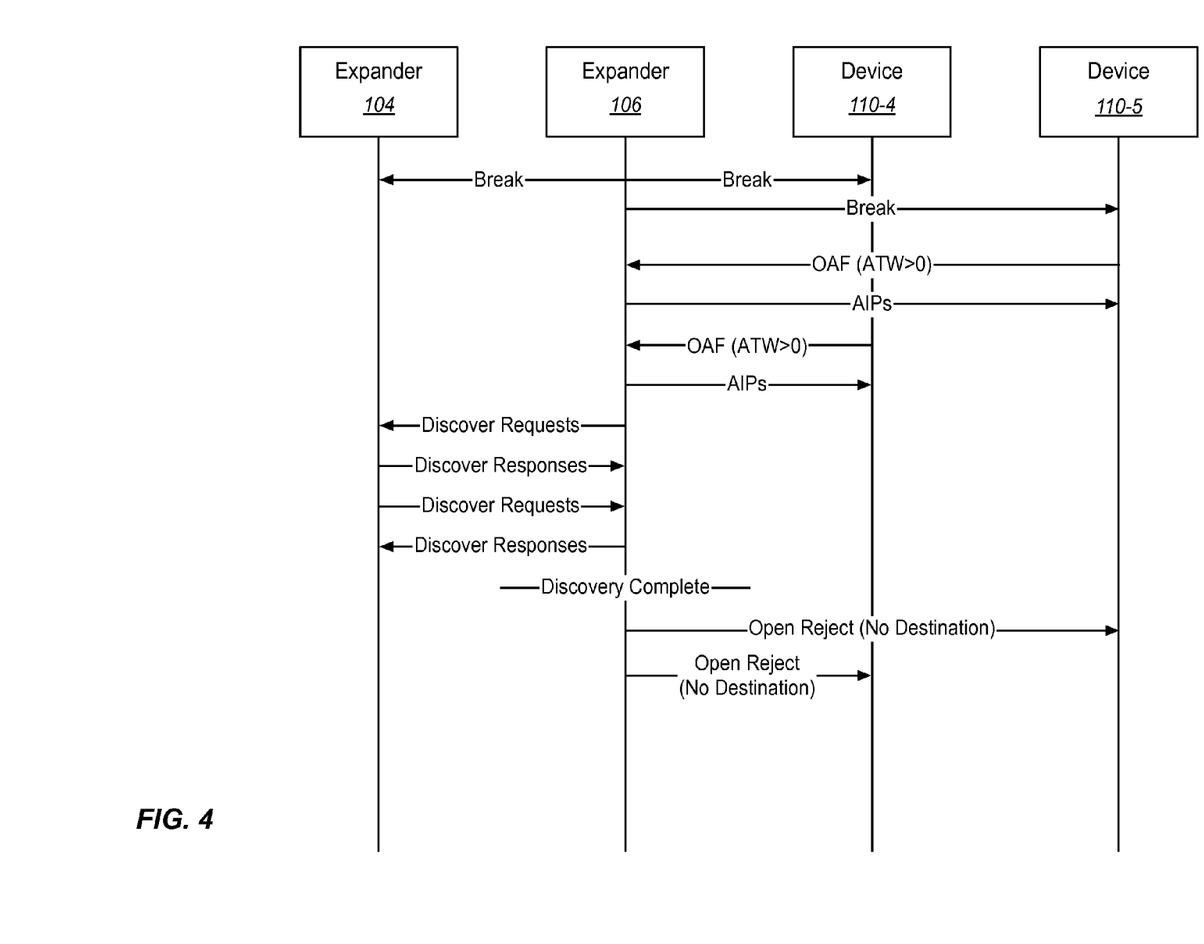

FIGS. 3 and 4 are exemplary transaction diagrams that may occur in the SAS domain 100 of FIG. 1. In this example, the SAS domain 100 is illustrated with only the expanders 104 and 106, the initiator 102, and the target devices 110-4 and 110-5 that are directly attached to the expander 106. The purpose for this limited illustration is to simplify the example as the number of transactions in the SAS domain 100 can be in the thousands at any given instance. Connections between the target devices 110-4 and 110-5 and the initiator 102 have been established and closed through their exchanges of Open Address Frames (OAFs), Open Accepts (OA), and Closes of the SAS protocol. The initiator 102 then experiences a failure which causes the expander 104 to issue a Broadcast Change and Discover Request to the expander 106 via the SAS protocol. In other words, the expander 104 detects the failure of the directly attached initiator 102 and is required to alert the other expanders in the SAS domain 100 to update their routing tables accordingly. The expander 106 therefore transfers a Discover Response to the expander 104 to initiate discovery of the SAS domain 100.

The target devices 110-4 and 110-5 remain unaware that the initiator 102 has failed. Accordingly, they may attempt to reconnect with the initiator 102. In this regard, the target device 110-4 transfers an OAF to the expander 104 with an arbitration wait time initially established as 0. Similarly, the target device 110-5 transfers an OAF with an arbitration wait time initially established as 0. The expander 106 transfers Arbitration In Progress's (AIPs) to the target device 110-5 as part of the arbitration process the expander 106 performs with target devices 110. The expander 104 responds to the OAF of the target device 110-4 with an Open Reject (Retry) of the SAS protocol because the initiator 102 is no longer part of the SAS domain 100 and because the expander 104 needs to complete the discovery process before it can inform the targets 110 that the initiator 102 is no longer part of the SAS domain 100.

Since a lane has become available for the target device 110-5, the expander 106 transfers an OAF with an arbitration wait time initially established as 0 on behalf of the target device 110-5. The expander 104 responds to the target device 110-5 with a similar Open Reject (Retry) because the initiator 102 is gone and the expander 104 has not completed the discovery process. This process continues and the arbitration wait times of the OAFs increase as illustrated by the OAF (AWT>0). Eventually, the lanes between the expanders 104 and 106 are clogged and prevent discovery of the SAS domain 100 by the expanders because a race condition exists between the SMP initiator 114 of the expander 106 and the target devices 110-4 and 110-5.

Once the arbitration wait time of the OAFs breach some threshold time and/or it is determined by the link manager of the expander 106 that its SMP initiator 114 is losing arbitration and cannot complete its discovery process, the expander 106 broadcasts a Break of the SAS protocol to the devices 110-4 and 110-5 (as well as any other devices directly attached to the expander 104 arbitrating for connections to the initiator 102), as illustrated in FIG. 4. Such has the effect of preventing the devices 110-4 and 110-5 from directly contacting the initiator 102 through the expander 104 and suspending arbitration. Thus, when the devices 110-4 and 110-5 need to complete their requests from the initiator 102, they first go through the expander 106.

The expander 106, in turn, transfers AIPs to the target devices 110-4 and 110-5 such that the discovery process can continue. In other words, the AIPs to the target devices 110-4 and 110-5 conceal the failure of the initiator 102 by tricking the target devices 110-4 and 110-5 into believing that they are simply waiting for a connection to the initiator 102. Thereafter, the expander 106 issues Discover Requests to the expander 104 to update its routing tables and the expander 104 returns that information through Discover Responses. The same occurs with the expander 104 to the expander 106 until discovery is complete and each of the expanders in the SAS domain 100 has their respective routing tables. Again, each expander's routing tables generally do not include information pertaining devices directly attached thereto. Although, nothing herein is intended to limit the invention and such a manner.

Once discovery is complete and after learning through successful discovery that the initiator 102 is no longer present in the SAS domain 100, the expander 106 issues Open Reject (No Destination) to each of the devices 110-4 and 110-5 so that they cease their attempts to reconnect with the failed initiator 102. In other words, once the devices 110-4 and 110-5 understand that the initiator 102 no longer exists in the SAS domain 100, the devices 110-4 and 110-5 stop attempting to reconnect with the initiator 102.

Figure 5:
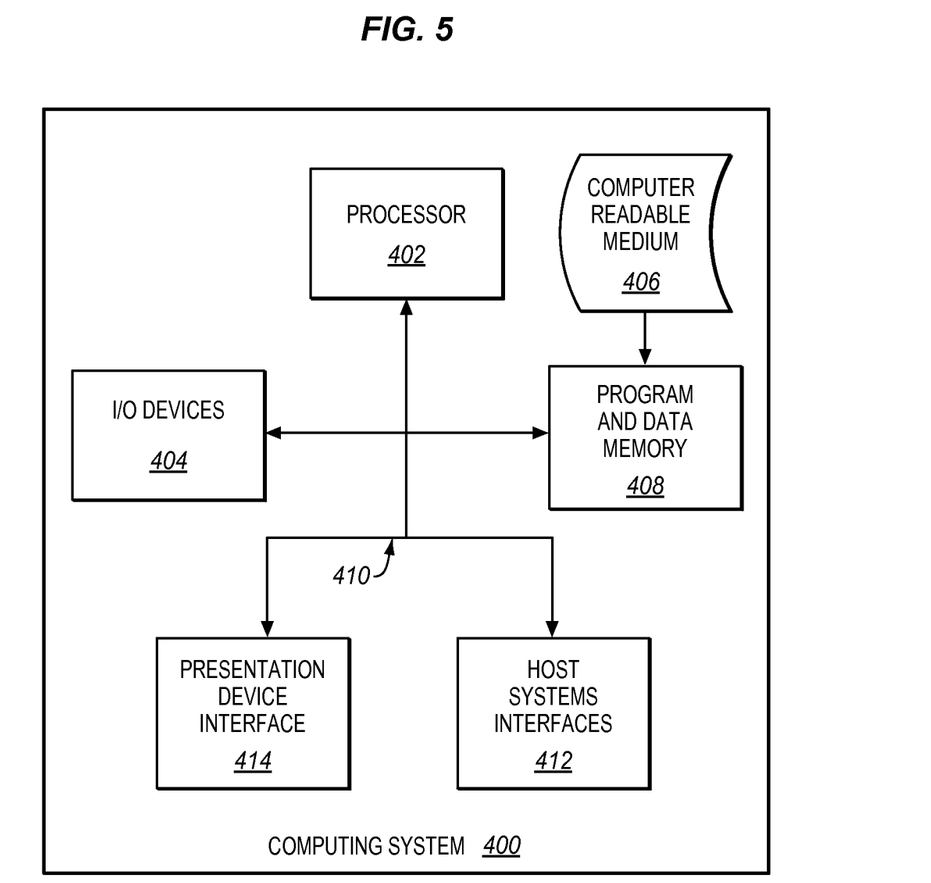
FIG. 5 illustrates a computing system in which a computer readable medium provides instructions for performing methods herein.

The invention can take the form of an entirely hardware embodiment, an entirely software embodiment or an embodiment containing both hardware and software elements. In one embodiment, the invention is implemented in software, which includes but is not limited to firmware, resident software, microcode, etc. FIG. 5 illustrates a computing system 400 in which a computer readable medium 406 may provide instructions for performing any of the methods disclosed herein.

Furthermore, the invention can take the form of a computer program product accessible from the computer readable medium 406 providing program code for use by or in connection with a computer or any instruction execution system. For the purposes of this description, the computer readable medium 406 can be any apparatus that can tangibly store the program for use by or in connection with the instruction execution system, apparatus, or device, including the computer system 400.

The medium 406 can be any tangible electronic, magnetic, optical, electromagnetic, infrared, or semiconductor system (or apparatus or device). Examples of a computer readable medium 406 include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

The computing system 400, suitable for storing and/or executing program code, can include one or more processors 402 coupled directly or indirectly to memory 408 through a system bus 410. The memory 408 can include local memory employed during actual execution of the program code, bulk storage, and cache memories which provide temporary storage of at least some program code in order to reduce the number of times code is retrieved from bulk storage during execution. Input/output or I/O devices 404 (including but not limited to keyboards, displays, pointing devices, etc.) can be coupled to the system either directly or through intervening I/O controllers. Network adapters may also be coupled to the system to enable the data processing system to become coupled to other data processing systems, such as through host systems interfaces 412, or remote printers or storage devices through intervening private or public networks. Modems, cable modem and Ethernet cards are just a few of the currently available types of network adapters.

What is claimed is:

1. A Serial Attached Small Computer System Interface domain, comprising:
    a first Serial Attached Small Computer System Interface expander coupled to an initiator; and
    a second Serial Attached Small Computer System Interface expander coupled to the first expander and to a target device, and operable to connect the target device to the initiator through the first expander,
    wherein the first expander is operable to detect a failure of the initiator, and to indicate a change in the domain to the second expander, and
    wherein the second expander is operable to detect an increase in arbitration wait time for a connection between the initiator and the target device, to determine a race condition exists in the second expander, to deny the connection between the initiator and the target device based on the increased arbitration wait time, to direct the target device to wait for another connection, to perform a discovery of the domain based on the change to the domain, and to prevent a subsequent connection by the target device to the failed initiator after discovery completes.

2. The domain of claim 1, wherein:
    the second expander is further operable to issue a Break of the Serial Attached Small Computer System Interface protocol to deny the connection between the failed initiator and the target device.

3. The domain of claim 1, wherein:
    the second expander is further operable to issue an Open Reject-No Destination of the Serial Attached Small Computer System Interface protocol to prevent the subsequent connection by the target device to the failed initiator.

4. The domain of claim 1, wherein:
    the second expander is further operable to conceal the failure of the initiator via an Arbitration In Progress of the Serial Attached Small Computer System Interface protocol that directs the target device to wait for another connection until the discovery completes.

5. The domain of claim 1, wherein:
    the second expander comprises a routing table of the domain; and
    the second expander is further operable to remove information about the failed initiator from the routing table of the second expander during discovery.

6. The domain of claim 5, wherein:
    the second expander comprises a link manager that is operable to arbitrate connections of the target device to other initiators in the domain after the information about the initiator is removed from the routing table of the second expander.

7. A method operable in a Serial Attached Small Computer System Interface domain comprising at least first and second expanders, the method comprising:
    detecting a failure of an initiator via the first expander;
    indicating a change in the domain from the first expander to the second expander;
    detecting, via the second expander, an increase in arbitration wait time for a connection between the initiator and the target device;
    determining a race condition exists in the expander;
    denying, via the second expander, the connection between the initiator and the target device based on the increased arbitration wait time;
    directing, via the second expander, the target device to wait for another connection to the initiator;
    performing, via the second expander, a discovery of the domain based on the change to the domain; and
    preventing, via the second expander, a subsequent connection by the target device to the failed initiator after discovery completes.

8. The method of claim 7, further comprising:
    issuing, via the second expander, a Break of the Serial Attached Small Computer System Interface protocol to deny the connection between the failed initiator and the target device.

9. The method of claim 7, further comprising:
    issuing, via the second expander, an Open Reject-No Destination of the Serial Attached Small Computer System Interface protocol to prevent the subsequent connection by the target device to the failed initiator.

10. The method of claim 7, further comprising:
    issuing, via the second expander, an Arbitration In Progress of the Serial Attached Small Computer System Interface protocol to direct the target device to wait for another connection and conceal the failure of the initiator.

11. The method of claim 7, further comprising:
    removing, via the second expander, information about the failed initiator from a routing table of the second expander during discovery.

12. The method of claim 11, further comprising:
    arbitrating, via the second expander, connections of the target device to other initiators in the domain after the information about the initiator is removed from the routing table of the second expander.

13. One or more non-transitory computer readable mediums comprising instructions that, when executed by at least first and second expanders in a Serial Attached Small Computer System Interface domain, direct the expanders to:
    detect a failure of an initiator via the first expander;
    indicate a change in the domain from the first expander to the second expander;
    detect, via the second expander, an increase in arbitration wait time for a connection between the initiator and the target device;
    determine a race condition exists in the expander;
    deny, via the second expander, the connection between the initiator and the target device based on the increased arbitration wait time;
    direct, via the second expander, the target device to wait for another connection to the initiator;
    perform, via the second expander, a discovery of the domain based on the change to the domain; and
    prevent, via the second expander, a subsequent connection by the target device to the failed initiator after discovery completes.

14. The one or more computer readable mediums of claim 13, further comprising instructions that direct the second expander to:
   issue a Break of the Serial Attached Small Computer System Interface protocol to deny the connection between the failed initiator and the target device.

15. The one or more computer readable mediums of claim 13, further comprising instructions that direct the second expander to:
   issue an Open Reject-No Destination of the Serial Attached Small Computer System Interface protocol to prevent the subsequent connection by the target device to the failed initiator.

16. The one or more computer readable mediums of claim 13, further comprising instructions that direct the second expander to:
   issue an Arbitration In Progress of the Serial Attached Small Computer System Interface protocol to direct the target device to wait for another connection and conceal the failure of the initiator.

17. The one or more computer readable mediums of claim 13, further comprising instructions that direct the second expander to:
   remove information about the initiator from a routing table of the second expander during discovery.

18. The one or more computer readable mediums of claim 13, further comprising instructions that direct the second expander to:
   arbitrate connections of the target device to other initiators in the domain after the information about the initiator is removed from the routing table of the second expander.

* * * * *